July 5, 1938.　　C. F. WEINREICH　　2,122,703
NOZZLE FOR EXTRUDING STIFF PLASTIC MATERIAL
Filed Feb. 10, 1936
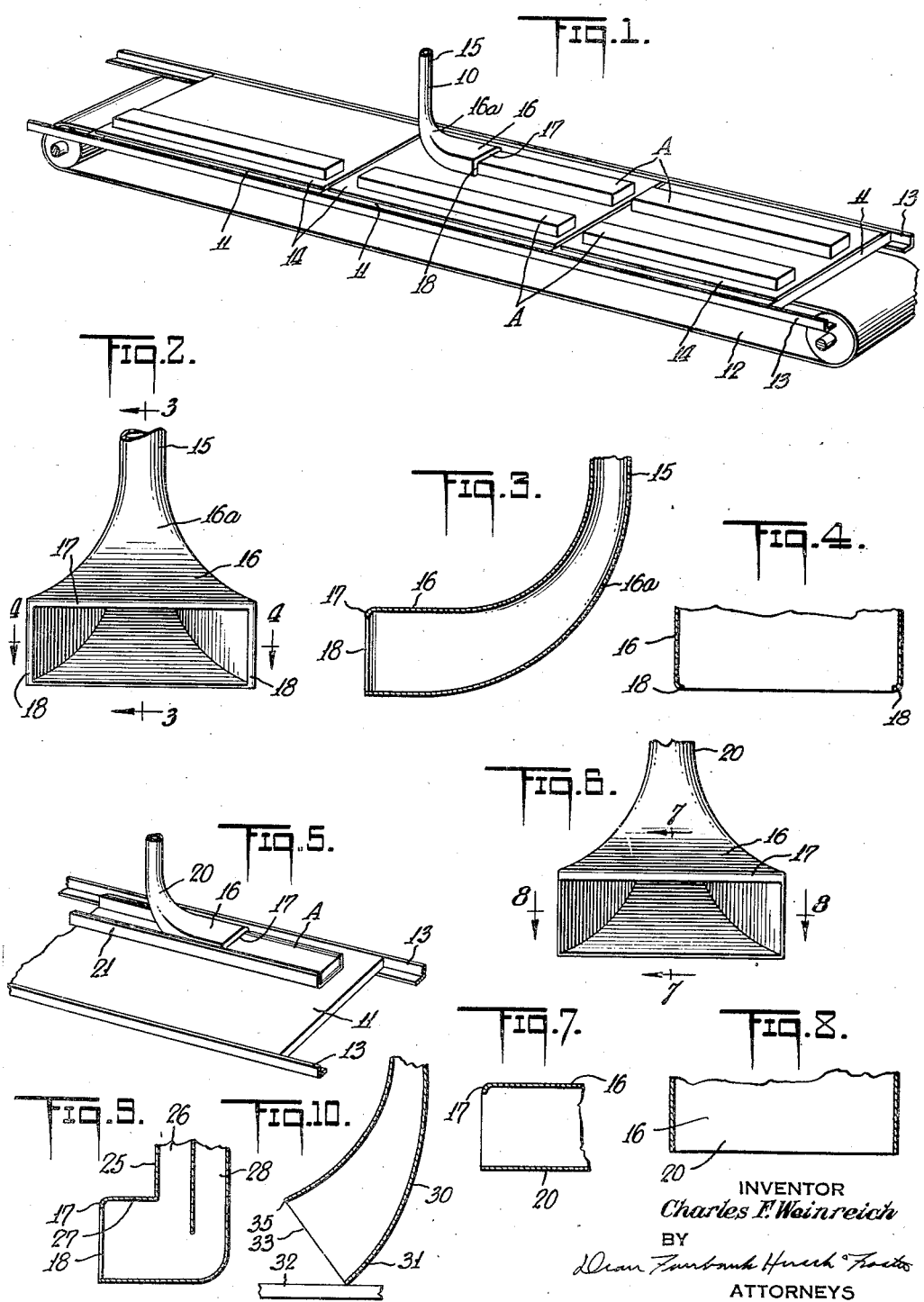
INVENTOR
Charles F. Weinreich
BY
ATTORNEYS Patented July 5, 1938

2,122,703

UNITED STATES PATENT OFFICE 2,122,703

NOZZLE FOR EXTRUDING STIFF PLASTIC MATERIAL

Charles F. Weinreich, Des Plaines, Ill., assignor to Cherry-Burrell Corporation, Chicago, Ill., a corporation of Delaware Application February 10, 1936, Serial No. 63,193

4 Claims. (Cl. 107—14)

The present invention relates to apparatus for making bars of ice cream by forcing semi-frozen aerated plastic ice cream continuously from a nozzle having its discharge end of the cross-sectional shape and size of the desired bar. The ice cream as extruded is usually deposited on a support moving at substantially the same speed as the bar and is cut or otherwise subdivided transversely into the lengths desired preparatory to further freezing or hardening.

The extruded ice cream should be at least stiff enough so that it will be form-retaining and will maintain its predetermined cross-sectional area until final hardening.

The temperature of the ice cream is a factor controlling the hardness or stiffness. If the ice cream be too soft, it tends to flow laterally on the support or flatten out, and requires a long time to harden before packaging or shipping. If it be stiff the surface of the nozzle causes a friction or rasping of the surface of the extruded bar and imparts to the latter a rough or broken surface. The frictional contact of the ice cream with the inner surface of the nozzle, if excessive, does much to disrupt the close arrangement of the air cells and ice crystals which give stiffness to the product, and destroys the arrangement of the dispersed material in the vehicle or unfrozen part of the ice cream. Apparently it causes adjoining minute interstitial bubbles of air incorporated in and near the surface to merge to form larger bubbles which escape, leaving the surface of the bar pitted.

One object of the present invention is to provide a new and improved nozzle so shaped as to eliminate the disadvantages above referred to and adapted to form a bar of stiff form-retaining plastic material having a smooth exposed surface.

As an important feature of my invention, I provide the nozzle with a troweling edge at the outlet, which acts to impart to the exposed surface of the plastic material as it emerges from the nozzle, a smooth surface even though the material be as stiff as is practical for extruding. This troweling edge is thin so that it does not present any appreciable friction surface, and it does not extend inwardly to such an extent as to offer any substantial resistance to the flow. It acts on the surface of the material just as it emerges and smooths over any roughness or irregularities caused by the frictional contact above referred to.

Since the bottom surface of the deposited plastic bar rests on the table, tray or other moving support, the weight of the bar may be sufficient to prevent any irregularities from forming or being retained in this surface, although the edge may extend around the entire periphery of the nozzle. The troweling edge may be employed only for the surface or surfaces which are directly exposed on the formed bar. This may be three of the sides of a rectangular bar or may be only the top surface if the moving support be a channel-shaped tray.

In the accompanying drawing there is shown for the purpose of illustration, various forms of nozzles embodying the present invention. In the drawing:—

Fig. 1 shows a perspective view of one form of nozzle operating in conjunction with a conventional conveying system, for forming ice cream bars, Fig. 2 is an end view of the nozzle shown in Fig. 1, Figs. 3 and 4 are sections taken on the lines 3—3 and 4—4, respectively, of Fig. 2, Fig. 5 is a perspective view of another form of nozzle operating in conjunction with channel-shaped trays or troughs for receiving the deposited bar of ice cream, Fig. 6 is an end view of the nozzle shown in Fig. 5, Figs. 7 and 8 are sections taken on the lines 7—7 and 8—8, respectively, of Fig. 6, Fig. 9 is a vertical section showing another form of nozzle, and Fig. 10 is a vertical section showing still another form of nozzle.

In the specific form shown in Figs. 1–4, partially frozen ice cream having air incorporated therein to give it the desired overrun, and of form-retaining stiffness, is continuously delivered under pressure from a continuous freezer or other source to a nozzle 10. This nozzle 10 is disposed directly above a series of substantially horizontal trays 11 which may be placed end to end and moved substantially horizontally by hand or by any suitable means, as for instance the endless conveyer 12. These trays 11 are shown guided against lateral movement by a pair of guide members 13.

The extruded ice cream bar is continuously delivered from the nozzle 10 in a substantially horizontal direction directly above the trays 11 which are moved at a speed equal to the speed of discharge of the ice cream so that this bar is deposited on these trays as a continuous bar which may be cut transversely into longitudinal sections A by any suitable means such as a hand-operated knife or a mechanical cutter.

The trays 11 may be wide enough to permit the deposit of two or more bars thereon alongside of each other as shown, this being effected either through the use of a plurality of adjoining nozzles 10 or by turning each tray around after a bar has been deposited thereon, to present another longitudinal depositing surface to the discharging stream of ice cream.

In order to space the bar sections longitudinally, each tray upon completion of a cutting stroke thereon, and the succeeding tray, are given an accelerated forward movement, so that the ends of the bar sections will be spaced from the corresponding ends of their supporting trays.

In order to prevent the ice cream bars from sticking or adhering to the trays, each tray may have a sheet of non-absorbent paper 14 thereon which either covers substantially the entire surface of the tray, or which may merely be a longitudinal strip extending along that portion of the tray upon which the ice cream is deposited. This paper may be of such width and length that it can be folded to wrap the entire bar after it is hardened to prevent surface taint of cooler odors.

The trays, after the ice cream bar or bars have been deposited thereon, is taken promptly into a freezing chamber or hardening room where the bars are further frozen and hardened. Thereafter they may then be transversely cut into sections, slices or bricks of the desired size and shape and suitably packaged.

The nozzle outlet may be of a height, width and shape dependent upon the size and shape of the bar to be produced. For instance it may be circular, oval, hexagonal, square, etc. In the specific form shown in Figs. 1–4, the nozzle includes a downwardly extending supply pipe section 15 leading from a suitable source of partially frozen ice cream under pressure, and a horizontally directed discharge or spout section 16 of larger and rectangular cross-sectional area to form a rectangular bar. These two sections 15 and 16 are integrally interconnected by a curved flaring pipe section 16a so that the flow of ice cream from the section 15 to the section 16 is attended with a minimum of resistance, a progressive expansion under reduction of pressure, and a reduction in speed of flow. The outlet lies in a plane at right angles to the direction of movement of the trays 11 so that the flow of ice cream from the nozzle is directed horizontally or parallel to the surface of the tray on which it is deposited.

As an important feature of the invention, troweling edges are formed on the discharge end of the nozzle. Preferably these edges are in the form of a lip 17 curved inwardly and downwardly from the end of the top wall of the nozzle, and flanges or lips 18 extending inwardly from the side walls. The flanges 17 and 18 extend transversely across the path of movement of the discharging bar of ice cream but only to a slight extent, and present troweling edges serving to smooth over and prevent any rough exposed surfaces on the bar as it emerges. These flanges 17 and 18 in commercial practice can be of such width that the thickness of the layer is controlled. However, they need not extend inwardly more than $\tfrac{1}{16}$ of an inch to $\tfrac{1}{8}$ of an inch.

In Figs. 5 to 8 there is shown another form of nozzle 20 which is similar in construction to the nozzle 10 of Figs. 1–4 except that it has no side flanges for troweling the side surfaces of the extruding stream of ice cream. This form of nozzle is particularly adapted for use in conjunction with elongated channel-shaped trays or troughs 21 into which the extruding stream of ice cream is deposited. In this construction, the trays 21 may be either supported directly on a conveyer for endwise movement, or may be supported on flat trays 11 which in turn rest on a conveyer, or may be moved along by hand. These trays 21 may be paper lined to prevent adhesion of the ice cream thereto, and have cross-sectional shapes corresponding to the desired cross-sectional shape of the ice cream bar.

The spout section 16 of the nozzle extends horizontally into the tray 21 with its outlet opening headed in the direction of movement of said tray and with its side walls closely adjacent to the side walls of the tray. As the stream of ice cream emerges from the nozzle, the bottom and side surfaces come in contact with the paper lined walls of the trays, so that these surfaces do not have to be troweled. However, in order to trowel the top exposed surface of the bar or stream, the nozzle is provided with the top flange or lip 17 shaped and positioned as already described with reference to the construction of Figs. 1–4.

In Fig. 9 is shown a nozzle 25 having a downwardly extending inlet pipe section 26 and a horizontally extending discharge or spout section 27 of rectangular cross-sectional shape, these sections having a rectangular bend therebetween. In this form, the discharge end of the nozzle is provided with troweling flanges 17 and 18 or merely a top flange 17 as above described. If it is desired to deliver two flavors of ice cream to form a laminated bar, there may be provided a second supply pipe 28 entering below the end of the pipe section 26.

In Fig. 10 there is shown another form of nozzle 30 in which the discharging or spout section 31 is directly at an angle to the plane of the moving tray or other surface 32 upon which the stream of ice cream is to be deposited, so that the bar as it emerges from the outlet 33 of the nozzle and is deposited on said surface 32, has its direction of flow changed in respect to the top wall, and thus the edge 35 of said top wall forms a troweling flange or edge and acts as does the flange 17 to impart a smooth surface to the extruded bar.

In this construction, no separate flange is necessary for effecting troweling action on the top surface of the extruding stream of ice cream. However, the side walls of the nozzle may be provided with troweling flanges similar to the flanges 18 of the construction of Figs. 1–4 already described.

If it is desired to form a bar of ice cream having a plurality of layers of different flavors, any nozzle embodying the present invention may be provided with a series of spaced partitions so as to divide it into separate passages, and ice cream of different flavors may be delivered into each of said passages. In such a construction, the outlet ends of the partitions may be spaced inwardly from the outlet end of the nozzle to form an outlet passage into which the several passages merge, and which is provided with troweling edges as above described.

Having thus described my invention, what I claim as new and desire to secure by Letters Patent is:—

1. A nozzle for discharging a bar of partially frozen aerated ice cream of form sustaining hardness and of predetermined cross-sectional shape and size, said nozzle having a pair of opposing walls flaring toward the outlet and having its maximum cross-sectional area adjacent to the outlet end to permit gradual expansion transversely to the direction of flow and increase in cross-sectional area of the body of ice cream under progressive reduction in pressure, said nozzle presenting an inwardly projecting troweling edge extending to a slight extent into the path of movement of the discharging bar at the outlet of the nozzle, and acting to smooth over the surface of the bar as it emerges from the nozzle but without substantially retarding the outflow.

2. A nozzle for discharging a bar of partially frozen aerated ice cream of form sustaining hardness and of predetermined cross-sectional shape and size, said nozzle having top, bottom and side walls flaring toward the outlet and having its maximum cross-sectional area adjacent to the substantially horizontally directed outlet end to permit gradual lateral expansion and increase in cross-sectional area of the body of ice cream moving through the nozzle under progressive reduction in pressure, said top wall having an inwardly projecting troweling edge rigid therewith and extending to a slight extent into the path of movement of the discharging bar at the outlet of the nozzle, and acting to smooth over the surface of the bar as it emerges from the nozzle but without substantially retarding the outflow.

3. A nozzle for discharging a bar of partially frozen aerated ice cream of form sustaining hardness and of predetermined cross-sectional shape and size, said nozzle having top and bottom walls and opposed side walls, at least one pair of said walls flaring toward the outlet whereby the nozzle has its maximum cross-sectional area adjacent to the outlet end to permit gradual lateral expansion and increase in cross-sectional area of the body of ice cream moving through the nozzle under progressive reduction in pressure, the top and side walls of said nozzle each presenting an inwardly projecting comparatively thin troweling edge surface extending to a slight extent into the path of movement of the dischargeing bar at the outlet of the nozzle, and acting to smooth over the surface of the bar as it emerges from the nozzle but without substantially retarding the outflow.

4. A nozzle for horizontally discharging a bar of partially frozen aerated ice cream of form sustaining hardness and of predetermined cross-sectional shape and size, said nozzle having a pair of opposing substantially vertical walls flaring toward the outlet and having its maximum cross-sectional area adjacent to the outlet end to permit gradual horizontal expansion transversely to the direction of flow under progressive reduction in pressure, the top wall of said nozzle presenting a downwardly projecting edge extending to a slight extent into the path of movement of the discharging bar at the outlet of the nozzle, and acting to smooth over the top surface of the bar as it emerges from the nozzle but without substantially retarding the outflow.

CHARLES F. WEINREICH.